Feb. 6, 1968   R. GIRARD   3,367,590
PROJECTING APPARATUS
Filed Nov. 4, 1965   2 Sheets-Sheet 2
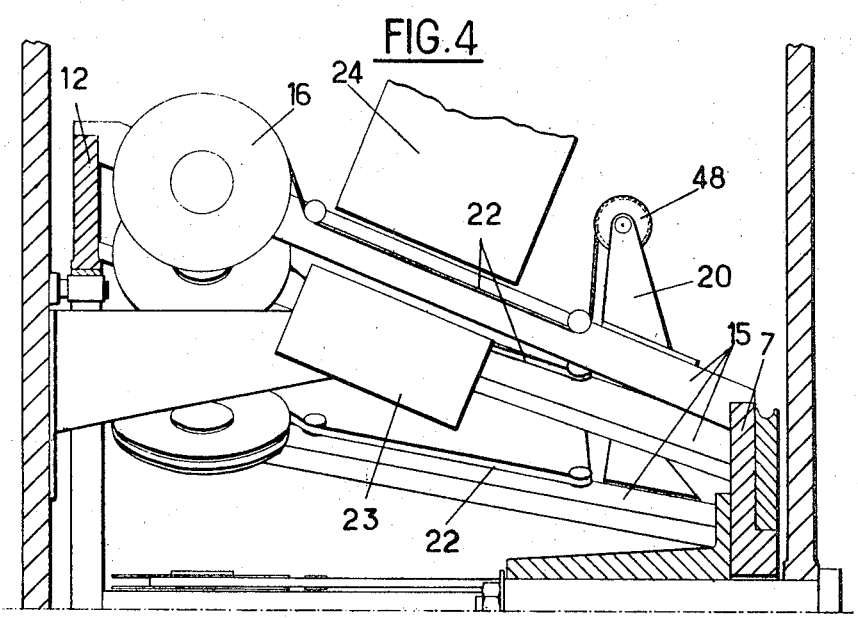
Inventor
RENE GIRARD
By Holcombe, Wetherill + Brisebois
Attorneys

United States Patent Office 3,367,590
Patented Feb. 6, 1968

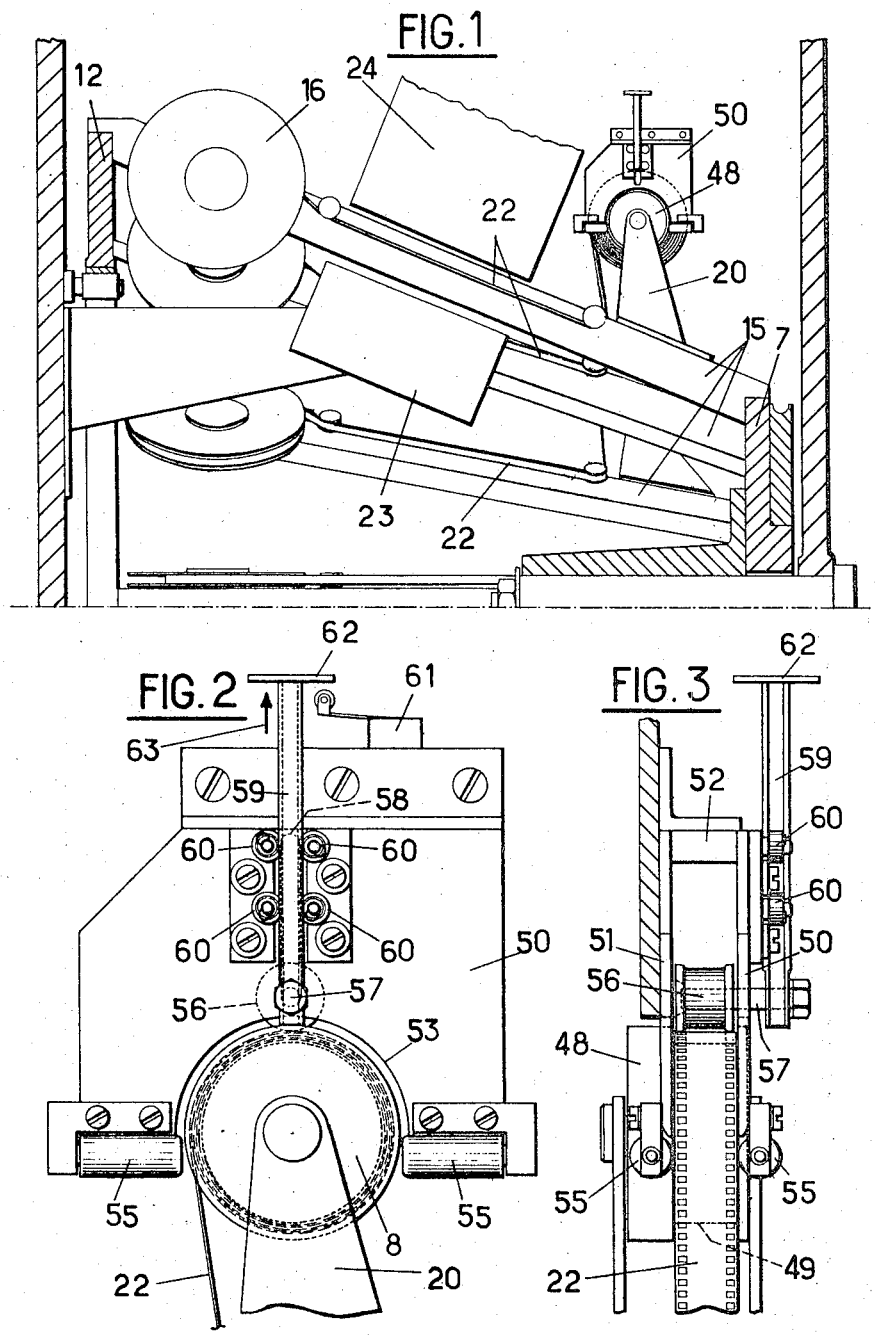

3,367,590
PROJECTING APPARATUS
Rene Girard, 72 Blvd. du Montparnasse,
Paris 14, France
Filed Nov. 4, 1965, Ser. No. 506,314
Claims priority, application France, Nov. 4, 1964,
993,858, Patent 1,421,538
6 Claims. (Cl. 242—55.11)

ABSTRACT OF THE DISCLOSURE

Apparatus for selectively projecting any one of a plurality of films, which apparatus comprises a rotatable turret, a first set of flanged film reels at one end of the turret, a corresponding second set of substantially flangeless film reels at the other end of the turret, and a pair of stationary spaced plates having registering recesses through which the second set of reels passes as said turret rotates. The plates serve to prevent film being fed onto or off of a film reel of the second set from being transversely displaced when that film reel is positioned between the plates.

---

In automatic film projectors, and particularly in those which comprise a projector having two parts associated with a film magazine which is either slidable or rotatable, each of the films is generally carried on a pair of reels which serve alternately to deliver and receive the film.

A set of photoelectric cells placed near the film usually serves to initiate the projecting, stopping of projection, the rewinding, and the stopping of the rewinding.

The object of the invention is to reduce the size of such a magazine and at the same time simplify the apparatus for initiating the operations, especially the stopping of the rewinding.

A further object of the present invention is to provide a new article of manufacture which consists of an automatic device for projecting a plurality of films essentially characterized by the fact that each film is wound at one end on a reel capable of receiving the entire film whereas the other end is fixed to a drum which is smooth or provided with a shallow groove, the apparatus further comprising two flat end members fixed to the framework of the device and so recessed that each of the drums may move into a position such that the end members guide the film on the drum thus serving as flanges for the drum when the film is wound on the drum. This apparatus may also have the following features taken singly or in combination:

(1) The two edges of the end members flanking the recess through which the drum passes are provided with rollers which assist in guiding the film and reducing sliding.

(2) A mobile pressure roller is positioned between the end members and rotates on the circumferential surface of the coiled up film on the drum and this roller actuates one or more electrical contacts which initiate certain automatic operations as a function of the thickness of the coil of film on the drum, in particular the stopping of the rewinding when this thickness reaches a predetermined minimum.

In order that the invention may be clearly understood, one embodiment thereof will now be described purely by way of illustration with reference to the accompanying drawing on which:

FIGURE 1 is an axial section through a rotating magazine equipped with the device constituting the invention;

FIGURE 2 is a detail view showing the device constituting the invention on a larger scale;

FIGURE 3 is a vertical section taken through the device of FIGURE 2; and

FIGURE 4 is a view similar to FIG. 1 which shows the reduced size of the film in the magazine in stored position.

FIGURE 1 shows that the automatic projector comprises, as is customary, two parts 23 and 24 between which the stretched strips of each of the films 22 pass. These films are supported on a rotary magazine which itself comprises two rotating parts 7 and 12 connected by arms 15.

One of the ends of each of the films 22 is mounted in the conventional way on a reel 16 carried by the magazine and on which it is normally rolled up for storage. The other end of the film 22 is attached to a drum 48 also carried by the magazine, which drum may, as shown in FIGURE 3, be formed with a slight groove 49 capable of receiving the first turns of the film.

Finally, the device comprises two end members 50 and 51 parallel to each other and spaced by a distance slightly greater than the width of the film. These end members are connected together by a support 52 which is attached to the main framework of the apparatus. This pair of end members is the only one in the apparatus which may comprise as many drums 48 as there are films. The two end members 50 and 51 are each provided with a recess 53 which, when the magazine is being rotated, permits each of the drums 48 with its corresponding supporting arm 20 to pass therethrough. The two lower edges of the end members 50 and 51 flanking the recess 53 are provided with aligned rollers 55 which guide the film between the end members 50 and 51 when the drum 48 is being rotated.

When the magazine is turning to a position corresponding to that of a film which has been selected, the drums 48 pass successively through the recess 53, which they can do freely because they are either empty or carry only a very small number of turns of film which lie inside the groove 49.

When the selected film 22 arrives in position, the rotating magazine stops and the corresponding drum 48 stops in the correct position between the two end members 50 and 51, the film is then projected in a conventional manner while the film paid out by the projector is received on the drum 48 which is frictionally driven.

The first turns of the film are then guided both where they arrive at the drum and in the region diametrically opposed thereto and on both sides by the rollers 55 so that they are very flat when they are wound on the drum. In any case the two end members 10 and 11 which are very close to the plane of this roller resist any tendency of the coil to deform due to sliding of individual turns thereof on each other. During the subsequent rewinding the film unwinds from the drum 48 in the same manner.

As an improvement, a pressure roller 56 may be mounted between the two end members 50 and 51 to turn about a shaft 57 which extends through an oblong hole 58 in the end member 50 and is fixed to a member 59 which rolls vertically between four rollers 60 by the end member 50. This roller 60 rests by reason of its own weight. or is biased by a spring against the top of the coil wound on the drum 48 and consequently moves vertically as the diameter of the coil changes.

It is then possible to position a micro-switch 61 so that it is actuated by a member 62 fixed to the end of the member 59 in a predetermined position which corresponds to a minimum thickness of the film coiled on the drum 48. This micro-switch is used to control the stopping of the rewinding process when all of the film 22, except for a few turns, has been rewound on the corresponding reel 16.

An auxiliary mechanism, not shown, lifts the member 59 and the roller 56 a certain distance, represented schematically by the arrow 63, after the rewinding has been completed, in order to permit the free movement of the drums 48 while the next film is being selected. This mechanism is inactive during the projecting and rewinding steps.

The same apparatus may also be used to bring a stop to the projecting of the film and to the rewinding, provided that in this case there is a very exact regulation of the length and thickness of the film. It suffices for this purpose to add another micro-switch actuated by the part 62 in the upper part of its path of travel. Finally, it will be seen that the device according to the invention makes it possible to substantially reduce the size of the film carrying magazine regardless of its type and position. This advantage is naturally greater as the number of films is greater. On the other hand, the coil feeling device makes it possible to simplify the mechanism for detecting the end of the film which has heretofore been generally used.

It will of course be appreciated that the embodiment which has just been described has been given purely by way of example and may be modified as to detail without thereby departing from the basic principles of the invention.

What is claimed is:

1. Apparatus for projecting the selected one of a plurality of films, said apparatus comprising a rotatable turret, a first set of rotatably mounted film reels circumferentially spaced about and carried by said turret near one end thereof and a second set comprising an equal number of rotatably mounted reels circumferentially spaced about and carried by said turret near its other end, the axes of rotation of said reels being transverse to that of said turret, one reel of each set being aligned with a reel of the other set so that film may be wound from one to the other, the reel of only the first of said sets comprising both a core and transverse flanges having diameters sufficiently greater than that of said core to prevent axial displacement of said film when a large number of turns of film are wound on said core, and a pair of stationary spaced plates lying on opposite sides of and closely adjacent the path travelled between reels by a film in projecting position, said plates being recessed to permit said second set of reels, when substantially empty, to pass therethrough as said turret is rotated, said plates fitting so closely around the path of travel of said second set of reels as to prevent displacement of film wound onto whichever reel of said second set is in projecting position between said plates.

2. Apparatus as claimed in claim 1 comprising rollers mounted on said plates and positioned to bear against the edges of a film wound on the reel of said second set which is in projecting position.

3. Apparatus as claimed in claim 1 comprising drive means for driving a film carried on a pair of said reels in projecting position, a follower mounted to bear on the film wound on the reel of said second set which is in projecting position, said follower being mounted to move toward and away from the axis of said last mentioned reel as the diameter of the coil of film wound thereon varies, and means responsive to movements of said follower for controlling said drive means.

4. Apparatus as claimed in claim 3 in which said movement responsive means comprises a micro-switch positioned to stop said drive means when said coil diameter reaches a predetermined minimum.

5. Apparatus as claimed in claim 1 in which the reels of said second set are provided with narrow flanges defining with the circumferential surfaces of the cores of said reels grooves dimensioned to receive only a small number of turns of film.

6. Apparatus as claimed in claim 1 in which the reels of said second set have flangeless cylindrical circumferential surfaces.

References Cited

UNITED STATES PATENTS

| | | | |
|---|---|---|---|
| 2,290,071 | 7/1942 | Rinaldi | 352—123 |
| 3,041,926 | 7/1962 | Granelli | 352—8 |
| 3,168,993 | 2/1965 | Mathieu | 242—55.13 |

LEONARD D. CHRISTIAN, *Primary Examiner.*